United States Patent
Beaucamp et al.

(10) Patent No.: US 12,084,192 B2
(45) Date of Patent: Sep. 10, 2024

(54) DEVICE FOR ASSISTING THE PILOTING IN ACCELERATION OF AN AIRCRAFT IN TAXIING IN ORDER TO CONTROL ITS SPEED, RELATED AIRCRAFT AND METHOD

(71) Applicant: DASSAULT AVIATION

(72) Inventors: Angélique Beaucamp, Saint-Cloud (FR); Laurent Fillet, Saint-Cloud (FR); Nicolas Le Corre, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 31 days.

(21) Appl. No.: 17/872,628

(22) Filed: Jul. 25, 2022

(65) Prior Publication Data

US 2023/0025868 A1 Jan. 26, 2023

(30) Foreign Application Priority Data

Jul. 26, 2021 (FR) .................................. FR 21 08070

(51) Int. Cl.
*B64D 31/04* (2006.01)
*G05D 1/00* (2006.01)

(52) U.S. Cl.
CPC ........... *B64D 31/04* (2013.01); *G05D 1/0083* (2013.01)

(58) Field of Classification Search
None
See application file for complete search history.

(56) References Cited

U.S. PATENT DOCUMENTS

| | | | |
|---|---|---|---|
| 2009/0173821 A1* | 7/2009 | Bhargava | B64D 41/00 244/50 |
| 2010/0276535 A1* | 11/2010 | Charuel | B64C 25/405 244/50 |
| 2011/0004376 A1 | 1/2011 | Chatrenet et al. | |
| 2011/0290933 A1* | 12/2011 | Cros | B64C 25/405 244/50 |
| 2012/0136562 A1 | 5/2012 | Mere et al. | |
| 2013/0200209 A1 | 8/2013 | Goldman et al. | |
| 2013/0297102 A1 | 11/2013 | Highes et al. | |
| 2015/0210383 A1 | 7/2015 | De Mers et al. | |
| 2015/0364045 A1 | 12/2015 | Lissajoux et al. | |
| 2017/0032687 A1 | 2/2017 | Lamkin et al. | |
| 2017/0148333 A1 | 5/2017 | Alonso Tabares | |
| 2017/0305571 A1 | 10/2017 | Constans et al. | |
| 2018/0134404 A1 | 5/2018 | Granier et al. | |
| 2020/0198775 A1* | 6/2020 | Fraim | F16H 61/32 |

FOREIGN PATENT DOCUMENTS

| | | |
|---|---|---|
| CN | 111516887 A | 8/2020 |
| FR | 3058806 A1 | 5/2018 |

OTHER PUBLICATIONS

Search Report for priority application FR 21 08070.

\* cited by examiner

*Primary Examiner* — Vicky A Johnson
(74) *Attorney, Agent, or Firm* — Davidson Kappel LLC

(57) ABSTRACT

A device is for assisting the piloting in acceleration of an aircraft in taking in order to control its speed. The comprises a control member, adapted to be actuated by a pilot from a neutral position to define a taxiing piloting command for controlling the speed of the aircraft and a central controller, adapted to operate pilot at least one engine of the aircraft to apply the taxiing command defined by the pilot. The taxiing piloting command is an acceleration or deceleration command of the aircraft during taxiing.

21 Claims, 13 Drawing Sheets

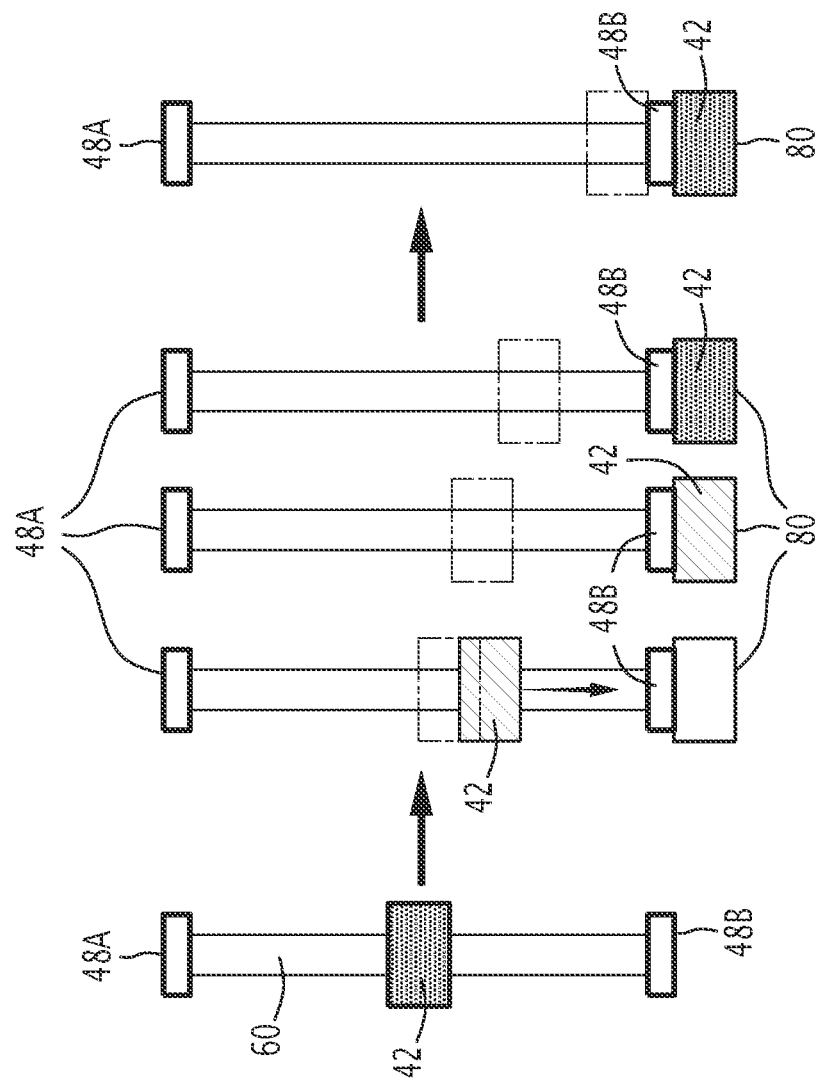

DEVICE FOR ASSISTING THE PILOTING IN ACCELERATION OF AN AIRCRAFT IN TAXIING IN ORDER TO CONTROL ITS SPEED, RELATED AIRCRAFT AND METHOD

The present disclosure relates to a device for assisting the piloting of an aircraft in taxiing, comprising a control member, able to be actuated by a pilot from a neutral position to define a taxiing piloting command for controlling the speed of the aircraft and a central controller, adapted to pilot at least one engine of the aircraft to apply the taxiing piloting command defined by the pilot.

The device for assisting the piloting of an aircraft in taxiing is, for example, located in the cockpit of an aircraft, to assist the pilot in controlling and piloting the speed of the taxiing aircraft as the aircraft rolls over the ground between its parking point and the runway on which it takes off or lands.

BACKGROUND

Taxiing of the aircraft on the ground occurs at the beginning and end of each flight. It involves moving the aircraft on taxiways that are sometimes winding, on slopes, or in the presence of obstacles or traffic.

In addition, taxiing must sometimes be carried out with time constraints linked to take-off or landing slots, in order to free the runway as quickly as possible.

For pilots, taxiing therefore requires a significant workload, as the environment wherein the aircraft is operating is potentially dense, with obstacles in close proximity.

The pilot in charge of taxiing must therefore orientate himself on the terrain, monitor obstacles and traffic, and control the rolling speed of the aircraft.

In order to set and maintain the desired rolling speed, he must use two different controls, namely the throttle and the brakes.

The throttle provides residual thrust to set and maintain the desired rolling speed and the brakes allow the speed to be reduced if necessary.

The taxiing system is therefore not entirely satisfactory, particularly in terms of passenger comfort and controllability.

The aircraft's engines are designed for flight and are therefore by nature sized to provide thrust far in excess of that required for rolling. (High) thrust and (slow on ground) response dynamics are problematic for taxiing.

Sometimes the pilot may accelerate more than he wishes, to allow the aircraft to reach a target rolling speed. In addition, the pilot may have to brake suddenly. More generally, the pilot may have difficulty in setting the target rolling speed, resulting in uncomfortable acceleration and/or deceleration for the passengers.

Other systems do not have this problem; it is known for example from US2015210383 to equip the wheels of the aircraft with an independent drive system, in particular an electric motor, and to provide the pilot with a separate device for assisting the piloting in taxiing which allows the electric motor to be controlled to move the aircraft at a set speed.

In addition, taxiing piloting is carried out by piloting speed, which can still lead, in some cases, to inconvenience for passengers if the acceleration or deceleration is too significant.

SUMMARY

It is therefore an aim of the present disclosure to provide a device for assisting the piloting of an aircraft in taxiing that is simple to implement on an aircraft, while increasing passenger comfort.

To this end, the present disclosure has as its subject matter a device for assisting the piloting of an aircraft in taxiing of the aforementioned type, characterised in that the taxiing command is an acceleration or deceleration command of the aircraft during taxiing.

The device for assisting the piloting of an aircraft in taxiing according to the present disclosure may comprise one or more of the following features, taken alone or in any combination that is technically possible:
- the central controller is also able to pilot at least one braking member of the aircraft to apply the acceleration or deceleration command defined by the pilot;
- after the acceleration or deceleration command has been applied and the control member is released, the control member is automatically returned to the neutral position;
- the neutral position is a fixed neutral with respect to a stroke of the control member, the control member being automatically returned to the fixed neutral position;
- the neutral position is a movable neutral position relative to a stroke of the control member, the control member being automatically returned to the movable neutral position, or the movable neutral being movable to the current position of the control member;
- the control member is able to be moved to a maximum acceleration stop and/or to a minimum deceleration stop;
- the maximum acceleration stop is able to move along the stroke of the control member to limit the stroke of the control member as a function of the current speed of the aircraft;
- the minimum deceleration stop is adapted to be overcome in order to reach a maximum deceleration detent wherein the control member is locked in position;
- the engine is a propulsion engine for the aircraft, in particular a jet engine or a turboprop engine, suitable for exerting a thrust force on the aircraft, and/or the engine is an electric motor for driving a wheel of the aircraft;
- the control member comprises a movable lever for piloting at least one engine of the aircraft capable of exerting a thrust force and/or for piloting a member for modifying the drag of the aircraft capable of reducing the mechanical energy of the aircraft, the device for assisting the piloting of an aircraft in taxiing being capable of switching between an inactive configuration during the take-off, flight and landing phases and an active configuration during taxiing;
- in the inactive configuration of the device for assisting the piloting of an aircraft in taxiing, the control member is adapted to be moved by the pilot to establish a command for varying the mechanical energy of the aircraft intended for the central controller, so that the central controller pilots the or each propulsion engine and the or each drag modification member, without piloting the or each braking member, and, in the active configuration of the device for assisting the piloting of an aircraft in taxiing, the control member is suitable for being moved by the pilot in order to establish an acceleration or deceleration command for the aircraft during taxiing, intended for the central controller, so that the central controller pilots each propulsion engine and optionally the or each braking member, advantageously without controlling the or each drag modification member;

the device comprises a button to activate the device for assisting the piloting of an aircraft in taxiing, which is suitable for placing the device for assisting the piloting of an aircraft in taxiing in the active configuration, the activation button being advantageously arranged on the movable lever;

the device comprises a button to deactivate the device for assisting the piloting of an aircraft in taxiing, which is suitable for placing the device for assisting the piloting of an aircraft in taxiing in the inactive configuration, the deactivation button being advantageously arranged on the movable lever;

the device comprises a light-up display system capable of producing at least one luminous indicator of the activation, operation and/or deactivation of the device for assisting the piloting of an aircraft in taxiing;

the central controller contains a correspondence table or formula associating an acceleration or deceleration value to be controlled with each actuation of the control member;

the control member comprises a support, a lever mounted so as to be movable in the support, and at least one position sensor, intended to measure the position of the movable lever with respect to the support, the position sensor being capable of measuring an information representative of the position of the movable lever and of transmitting the representative information to the central controller at each moment so that the central controller generates the command to accelerate or decelerate the aircraft as a function of the gap between the current position of the movable lever and a neutral position.

The present disclosure also has as its subject matter an aircraft comprising a device for assisting the taxiing of an aircraft as defined above, at least one engine capable of being piloted by the central controller in order to apply the acceleration or deceleration command established by the control member, the aircraft comprising at least one braking member optionally also capable of being piloted by the central controller in order to apply the acceleration or deceleration command established by the control member.

The present disclosure also has as its subject matter a method of piloting an aircraft in taxiing, implemented with a device for assisting the piloting of an aircraft in taxiing, the method comprising the following steps:

actuation, by a pilot, of a control member of the device for assisting the piloting of an aircraft in taxiing, from a neutral position in order to establish a taxiing piloting command;

piloting at least one engine of the aircraft by a central controller of the device for assisting the piloting of an aircraft in taxiing in order to apply the taxiing piloting command defined by the pilot, characterised in that the taxiing piloting command is an acceleration or deceleration command of the aircraft, the central controller optionally also piloting at least one braking member of the aircraft in order to apply the acceleration or deceleration command defined by the pilot.

BRIEF DESCRIPTION OF THE FIGURES

The present disclosure will be better understood upon reading the following description, given only as an example, and with reference to the attached drawings, in which:

FIGS. 9-13 are views similar to FIGS. 4-8, where the neutral position is a movable neutral.

DETAILED DESCRIPTION

Figure 1:
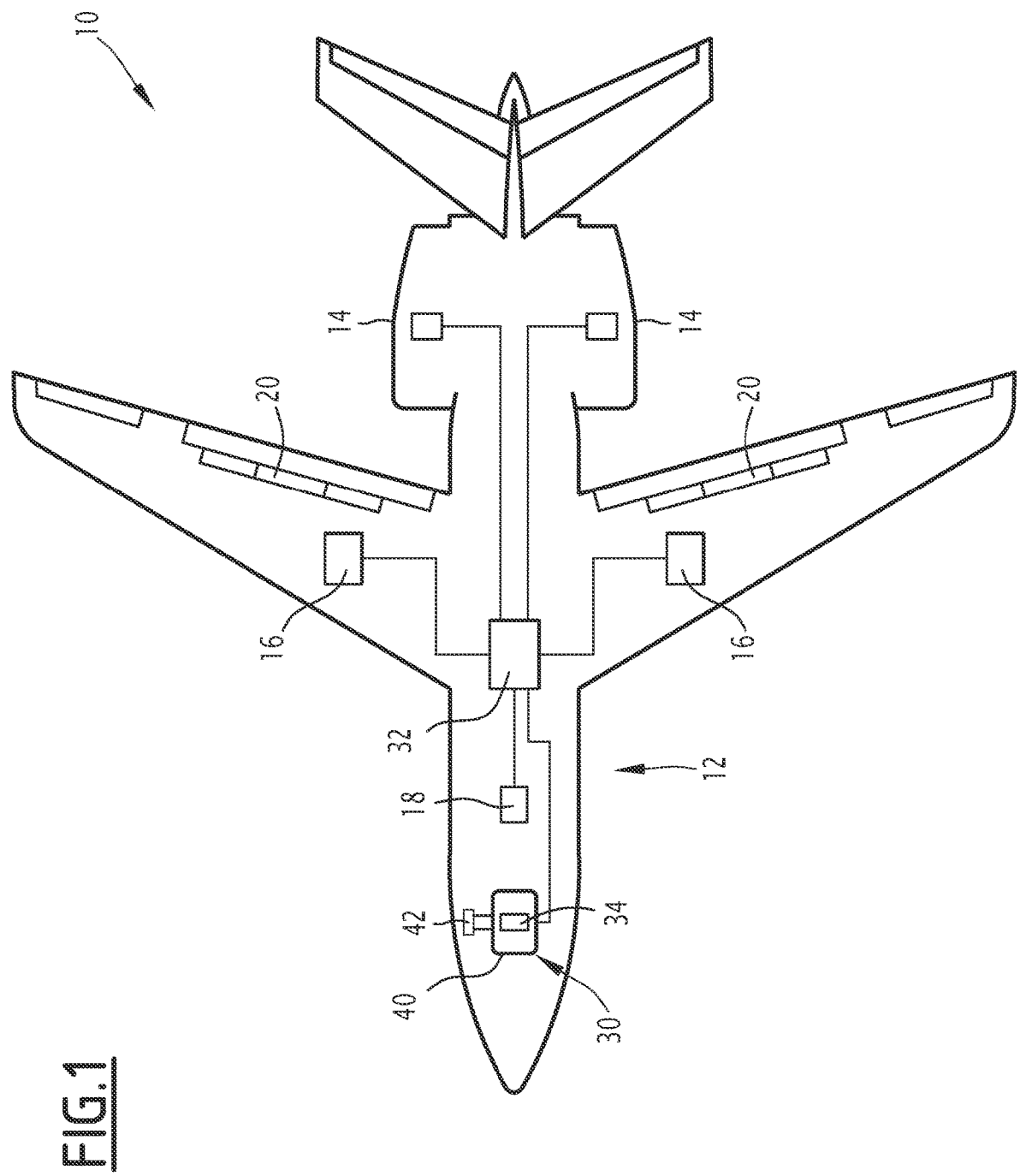
FIG. 1 is a schematic top view of an aircraft equipped with a first aircraft taxiing piloting assist device according to the present disclosure.

A first aircraft 10 provided with an aircraft taxiing piloting assist device 12 according to the present disclosure is schematically illustrated in FIG. 1. The aircraft taxiing piloting assist device 12 is preferably located in the cockpit of the aircraft 10.

The aircraft 10 comprises at least one propulsion engine 14, preferably several propulsion engines 14, suitable for generating thrust of the aircraft 10. Each propulsion engine 14 is, for example, a jet engine or a turboprop.

The aircraft 10 further comprises wheels (not visible), at least one braking member 16 associated with each wheel of the main gear, for slowing and stopping the aircraft 10 rolling on the ground, and at least one actuating member 18 for the braking member 16, preferably arranged in the cockpit of the aircraft 10.

Each propulsion engine 14 and each braking member 16 is adapted to be controlled by the taxiing aircraft assist device 12 when the aircraft 10 is rolling on the ground.

Thus, each propulsion engine 14 is controllable to vary a thrust force on the aircraft 10, increasing or decreasing the mechanical energy of the aircraft 10 as it rolls. Each braking member 16 is adapted to act on at least one wheel of the aircraft 10, to slow down the rotation of the wheel, for example by friction, and to reduce the mechanical energy of the aircraft 10 as it rolls.

The aircraft 10 further comprises at least one current rolling speed measurement sensor and at least one display, preferably located in the cockpit, adapted to display a rolling speed value based on the data from the current rolling speed measurement sensor.

In a known manner, the aircraft 10 further comprises members 20 for modifying the drag of the aircraft. These members 20 comprise speedbreaks, for instance.

Figure 2:
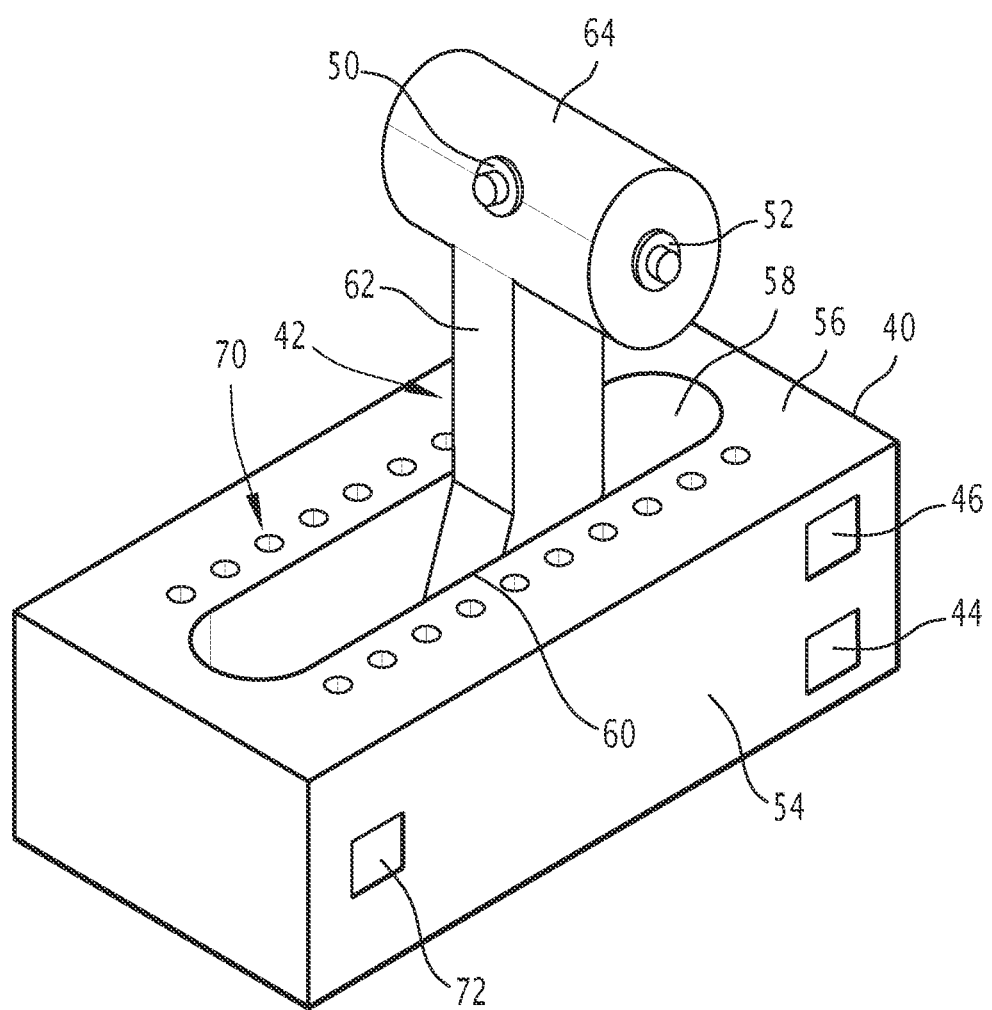
FIG. 2 is a schematic depiction of a control member of the aircraft taxiing piloting assist device of FIG. 1.

With reference to FIGS. 1 and 2, the aircraft taxiing piloting assist device 12 comprises at least one control member 30 adapted to be actuated by a pilot of the aircraft 10, from a neutral position, to apply an acceleration or deceleration command to the aircraft 10 during taxiing, and a central controller 32, adapted to pilot the or each propulsion engine 14 of the aircraft 10 and the or each braking member 16 of the aircraft, in accordance with the taxiing acceleration or deceleration command set by the pilot using the control member 30.

Advantageously, the aircraft taxiing piloting assist device 12 also comprises a light-up display system 34, capable of informing the pilot of the activation of the aircraft taxiing piloting assist device 12.

In the example shown in FIGS. 1 and 2, the control member 30 is here common with that of a main system for managing controlling the variation of mechanical energy of the aircraft 10 during flight, as described in the applicant's French patent application FR3058806.

The central controller 32 is then a flight central controller, capable of piloting each propulsion engine 14, and simultaneously each mechanical energy modification member 20, in addition to each braking device 16.

The aircraft taxiing piloting assist device 12 is then able to switch from an inactive configuration during the take-off, flight and landing phases of the aircraft 10 to an active configuration during taxiing.

In the inactive configuration of the aircraft taxiing piloting assist device 12, the control member 30 is adapted to be moved by the pilot to send a command for varying the mechanical energy of the aircraft 10 to the central controller 32, so that the central controller 32 controls each propulsion engine 14 and each mechanical energy modification member 20, without piloting each braking member 16.

The operation of the control member 30 and the control centre 32 in the inactive configuration of the aircraft taxiing piloting assist device 12 is described in detail in French patent application FR3058806. It will not be described in detail later.

In the active configuration of the aircraft taxiing piloting assist device 12, the control member 30 is adapted to be moved by the pilot to set an acceleration or deceleration command for the aircraft 10 during rolling, intended for the central controller 32, so that the central controller 32 pilots each propulsion engine 14 and each braking member 16 to apply the acceleration or deceleration command.

As illustrated in FIG. 2, the control member 30 comprises a support 40, a lever 42 movably mounted in the support 40 and at least one position sensor 44 for measuring the position of the movable lever 42 relative to the support 40.

The control member 30 further comprises an active system 46 for applying a force on the movable lever 42, capable of returning the movable lever 42 to a neutral configuration once the desired taxiing speed has been reached and capable of creating respective maximum acceleration and maximum deceleration stops 48A, 48B (visible in FIGS. 3 to 8), on either side of the stroke of the movable lever 42.

The control member 30 further comprises at least one button 50 for activating the active configuration of the aircraft taxiing piloting assist device 12, and at least one button 52 for returning to the inactive configuration of the aircraft taxiing piloting assist device 12.

Alternatively, the buttons 50, 52 are replaced by one or more buttons, for example located on the guidance panel or on a display screen of the aircraft 10.

Furthermore, an action by the pilot on the actuating member 18 of the braking members 16 also causes the aircraft taxiing piloting assist device 12 to return to the inactive configuration. Advantageously, this is also the case when activating another aircraft control mode, for example a take-off mode ("TO mode") or an automatic taxiing mode.

In this example, the support 40 is suitable for placement in the cockpit of the aircraft 10, preferably between the cockpit seats in the centre pylon.

As illustrated in FIG. 2, the support 40 has an openwork base 54 and a top cover 56 mounted on the base 54 through which the movable lever 42 is engaged.

The base 40 defines an interior volume 58 into which a lower part (not visible) of the mobile lever 30 and the active force application system 46 are inserted.

The top cover 56 closes the interior volume upwards by defining a longitudinal slide 60 for guiding the movement (rotation or translation) of the movable lever 42.

Advantageously, the slide 60 extends parallel to the longitudinal axis of the aircraft 10.

With reference to FIG. 2, the movable lever 42 comprises a rod 62 engaged through the slide 60, and a head 64 mounted at the upper end of the rod 62 for gripping by the hand of a user of the aircraft taxiing piloting assist device 12, in particular a pilot. The head 64 here carries the buttons 50, 52.

The movable lever 42 is adapted to be moved in the slide 60 relative to a neutral position. The movement of the movable lever 42 from the neutral position in a first direction (here forward) defines an acceleration command. The movement of the movable lever 42 from the neutral position in a second direction (here backwards), opposite to the first direction, defines a deceleration command.

In the example shown in FIGS. 4 to 8, the neutral position is fixed.

The position sensor 44 is adapted to measure information representative of the position of the movable lever 42 in the slide 60, and to transmit the representative information to the central controller 32 at each instant so that the central controller generates a command to accelerate or decelerate the aircraft 10 acting on each propulsion engine 14 of the aircraft and/or on each braking member 16, as a function of the difference gap between the current position of the movable lever 42 and the neutral position.

The active force application system 46 comprises at least one actuator and an actuator control unit connected to the central controller 32 for piloting the force applied to the movable lever 42 and the movement of the movable lever 42 in the slide 60.

The active force application system 46 is, for example, adapted to generate a force opposing the movement of the lever 42 when the pilot grips the lever 42 and moves it, to resist the movement generated by the pilot.

The active force application system 46 is further able, once the pilot has released the lever 42, to generate a biasing force on the lever 42 returning the lever 42 to the neutral position.

Furthermore, when the movement of the movable lever 42 with respect to the neutral position corresponds to a maximum acceleration allowed by the laws of the central controller 32, or to a minimum deceleration allowed by the laws of the central controller 32, the active force application system 46 is suitable for creating a stop force, respectively materializing the maximum acceleration stop 48A or the minimum deceleration stop 48B on the stroke of the lever 42.

The central controller 32 is able, depending on the position of the lever 42 in the slide 60, to determine the desired acceleration or deceleration command of the aircraft 10 during taxiing and to control each propulsion engine 14 and/or each braking member 16 to apply this command.

For example, the central controller 32 contains a correspondence table or formula associating each movement of the lever 42, measured by the position sensor 44, with an acceleration or deceleration value to be controlled.

Thus, each movement of the movable lever 42 caused by the pilot away from the neutral position towards the maximum acceleration stop 48A defines an acceleration command that is applied by the central controller 32, producing an increase in the speed of the aircraft 10, at the commanded acceleration.

Each movement of the lever 42 caused by the pilot away from the neutral position towards the maximum deceleration stop 48B defines a deceleration command that is applied by the central controller 32, producing a decrease in the speed of the aircraft 10, at the commanded deceleration.

When the pilot releases the lever 42, a return to zero acceleration occurs, and the central controller 32 maintains the current speed of the aircraft 10. The active force application system 46 returns the movable lever 42 to the neutral position.

In all cases, the pilot is able to observe the current speed of the aircraft as measured by the taxi rolling speed sensor on a cockpit display.

Furthermore, the control unit of the active force application system 46 is adapted to determine at each moment during rolling what is the maximum possible acceleration command of the aircraft 10, taking into account the current speed of the aircraft 10, a predefined maximum speed that the aircraft 10 can reach during taxiing (for example between 30 knots and 50 knots, i.e. between 55 km/h and 92 km/h) and to modify the position of the maximum acceleration stop 48A applied by the active force application system 46 according to the maximum possible acceleration command that can be applied.

Furthermore, the active force application system 46 is adapted to move the movable lever 42 from the current mechanical energy variation control position (corresponding to the current thrust applied by each engine 14) to the neutral position when the aircraft taxiing piloting assist device 12 switches in the active configuration, and moving the movable lever 42 to the current position for controlling the variation in mechanical energy (corresponding to the current thrust applied by each engine 14) when the aircraft taxiing piloting assist device 12 switches to the inactive configuration.

The light-up display system 34 comprises, for example, at least one light strip ramp 70 arranged in the vicinity of the control lever 42 and a control unit 72 for the or each light strip ramp 70, which is suitable for displaying at least one light indication on at least one point on the light strip ramp 70.

Figure 3:
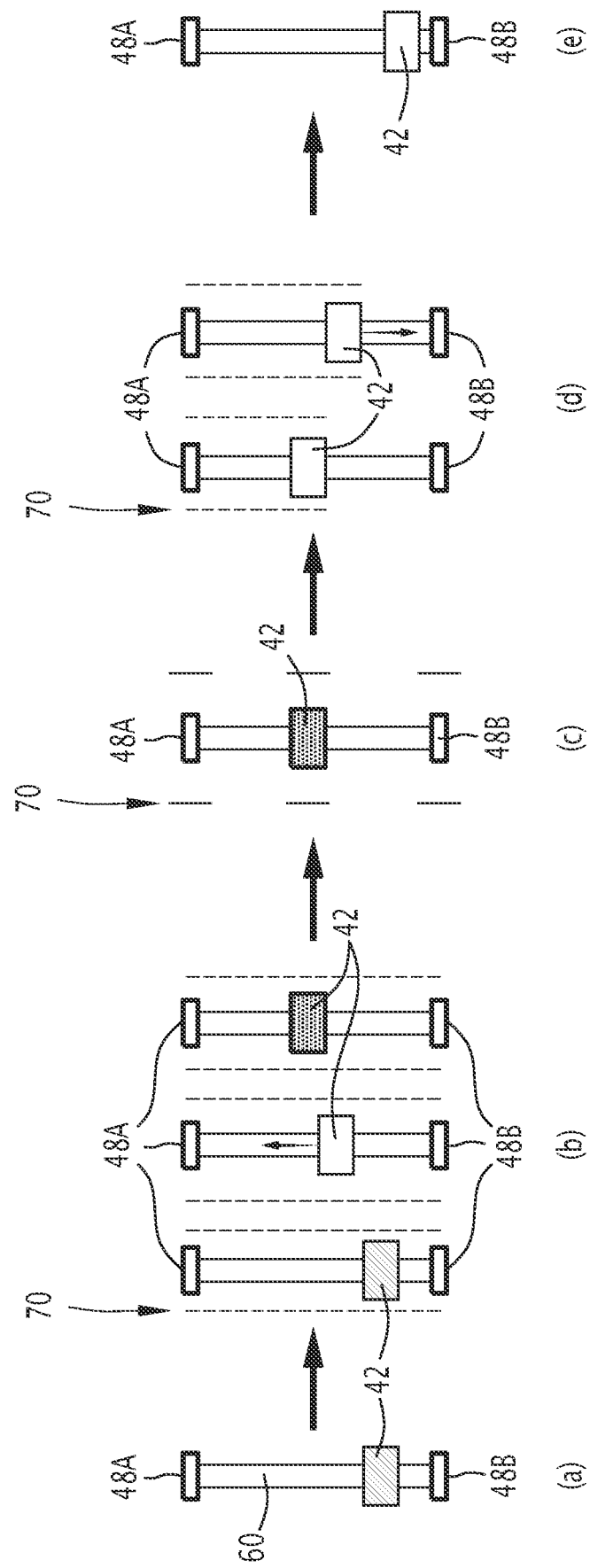
FIG. 3 is a flow diagram illustrating the activation and deactivation of the aircraft taxiing piloting assist device.

As illustrated in FIG. 3, the control unit 72 is, for example, adapted to display, on the light strip ramp 70, a first light indication representative of the activation of the aircraft taxiing piloting assist device 12 (see configuration (b) in FIG. 3), a second light indication representative of the current operation of the aircraft taxiing piloting assist device 12 (see configuration (c) in FIG. 3), and a third light indication representative of the deactivation of the aircraft taxiing piloting assist device 12 (see configuration (d) in FIG. 3).

In this example, the first light indication consists of illuminating a plurality of points on the ramp 70 along the length of the slide 60. The second light indication consists of illuminating only the positions of the stops 48A, 48B and the neutral position. The third light indication consists of the illumination of lamps on the ramp 70 from the maximum acceleration stop 48A to the current position of the movable lever 42.

A method of taxiing the aircraft 10 via the aircraft taxiing piloting assist device 12 will now be described. This method is for example carried out implemented after the aircraft 10 has landed on a runway, in particular after an automatic braking system during landing has been deactivated. Alternatively, it is implemented from the aircraft parking point to the take-off runway.

When the pilot wishes to use the aircraft taxiing piloting assist device 12, he switches it to the active configuration, for example by pressing the activation button 50 on the mobile lever 42.

In the example shown in FIG. 3, the light-up display system 34 advantageously displays the first light indication (see step (b) in FIG. 3).

The active force application system 16 moves the movable lever 42 to the neutral position, represented by the dotted square in FIG. 3.

The movable lever 42 thus remains at rest in this neutral position, which is advantageously marked by a local illumination of the ramp 70, according to the second light indication, as illustrated in step (c) of FIG. 3.

Figure 4:
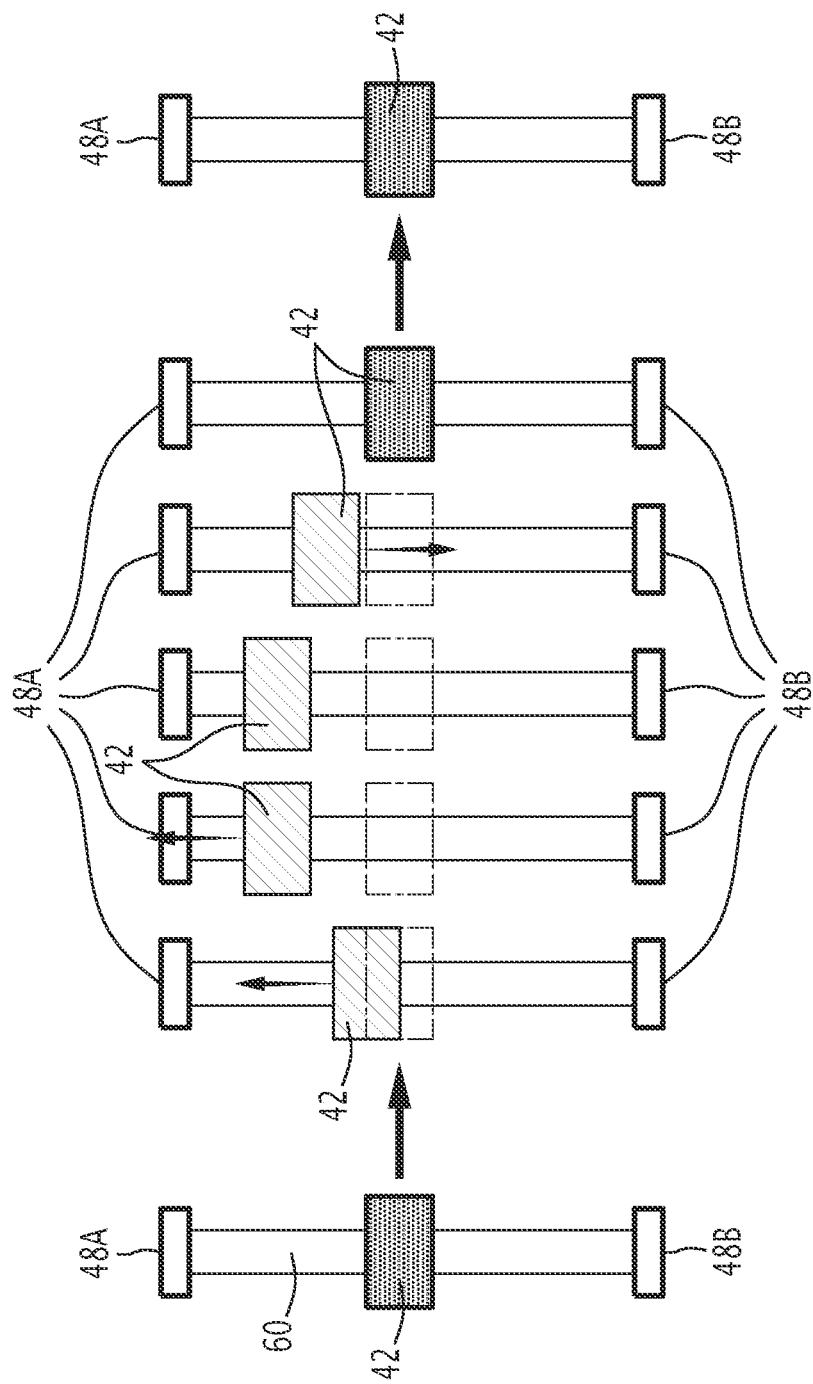
FIG. 4 is a schematic diagram illustrating the movement of the control member, when implementing an acceleration command of the aircraft, with respect to a fixed neutral position.

With reference to FIG. 4, if the pilot wishes to move faster when taxiing, he grips the movable lever 42, and moves it towards the maximum acceleration stop 48A, away from the neutral position (shown in dotted line) to set a desired acceleration of the aircraft 10 when taxiing.

The movement of the movable lever 42, and the established deviation from the neutral position then defines an acceleration command. The central controller 32 receives the representative information from the position sensor 44, and determines the acceleration command to be applied. It then controls the or each propulsion engine 14 to achieve the desired acceleration. The speed of the aircraft 10 increases progressively following the acceleration set by the command given by the pilot.

This avoids over-accelerating the aircraft 10 and maintains passenger comfort.

When the pilot is satisfied with the speed achieved, he releases the lever 42, and the acceleration decreases to a zero acceleration at which the central controller 32 maintains the current speed of the aircraft 10.

As illustrated in FIG. 4, the active force application system 46 returns the movable lever 42 to the neutral position.

Figure 5:
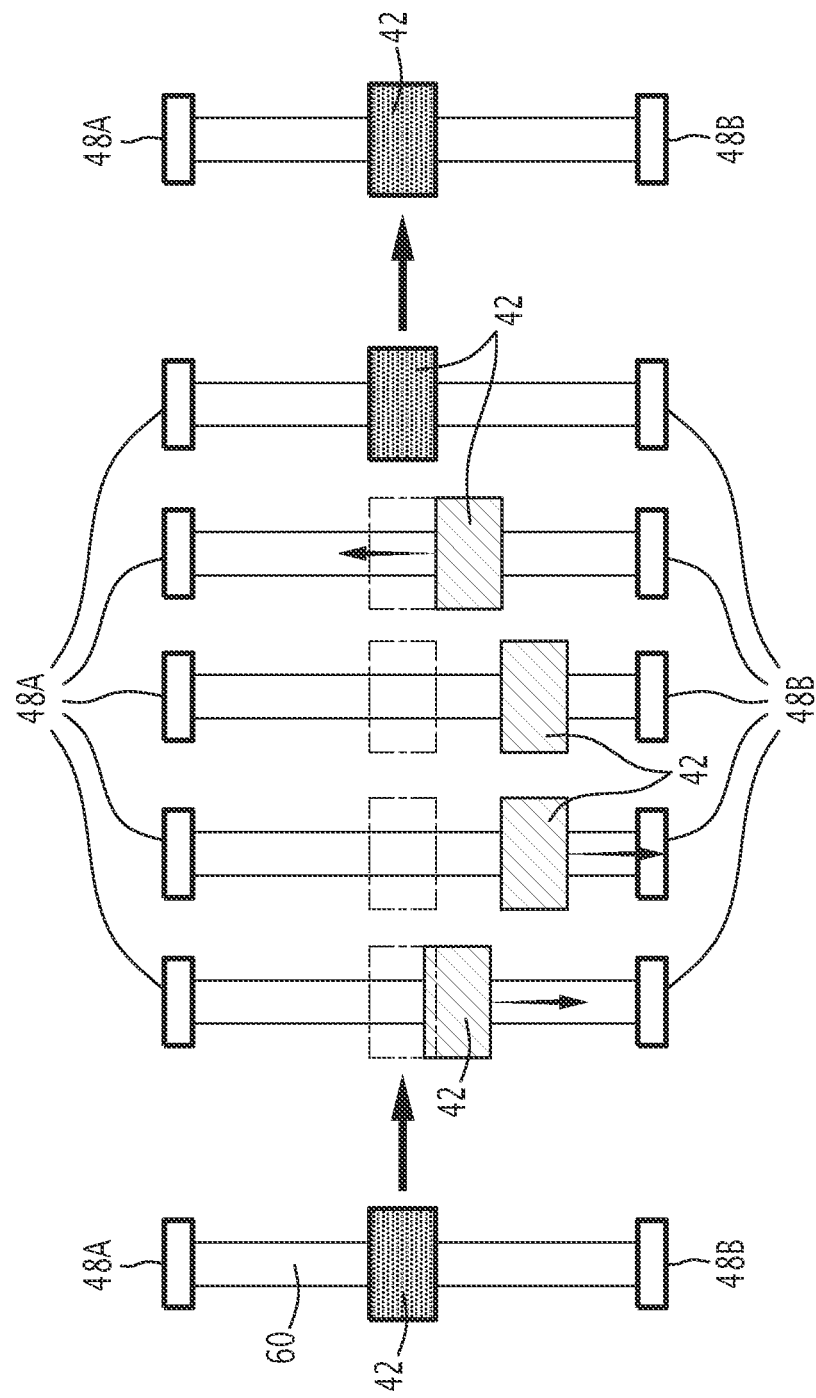
FIG. 5 is a view similar to FIG. 4, when implementing a deceleration command of the aircraft, relative to the fixed neutral position.

If the pilot wishes to apply a deceleration command instead, as shown in FIG. 5, he moves the movable lever 42 towards the maximum deceleration stop 48B.

The movement of the lever 42, and the established deviation from the neutral position then defines a deceleration command. The central controller 32 receives the representative information from the position sensor 44, and determines the deceleration command to be applied.

The central controller 32 then acts on each brake member 16, and/or on each propulsion engine 14, to achieve the desired deceleration. The speed of the aircraft decreases progressively following the deceleration set by the command given by the pilot.

When the pilot is satisfied with the speed achieved, he releases the lever 42, and the deceleration decreases to a zero acceleration at which the central controller 32 maintains the current speed of the aircraft 10.

As illustrated in FIG. 5, the active force application system 46 returns the movable lever 42 to the neutral position.

Figure 6:
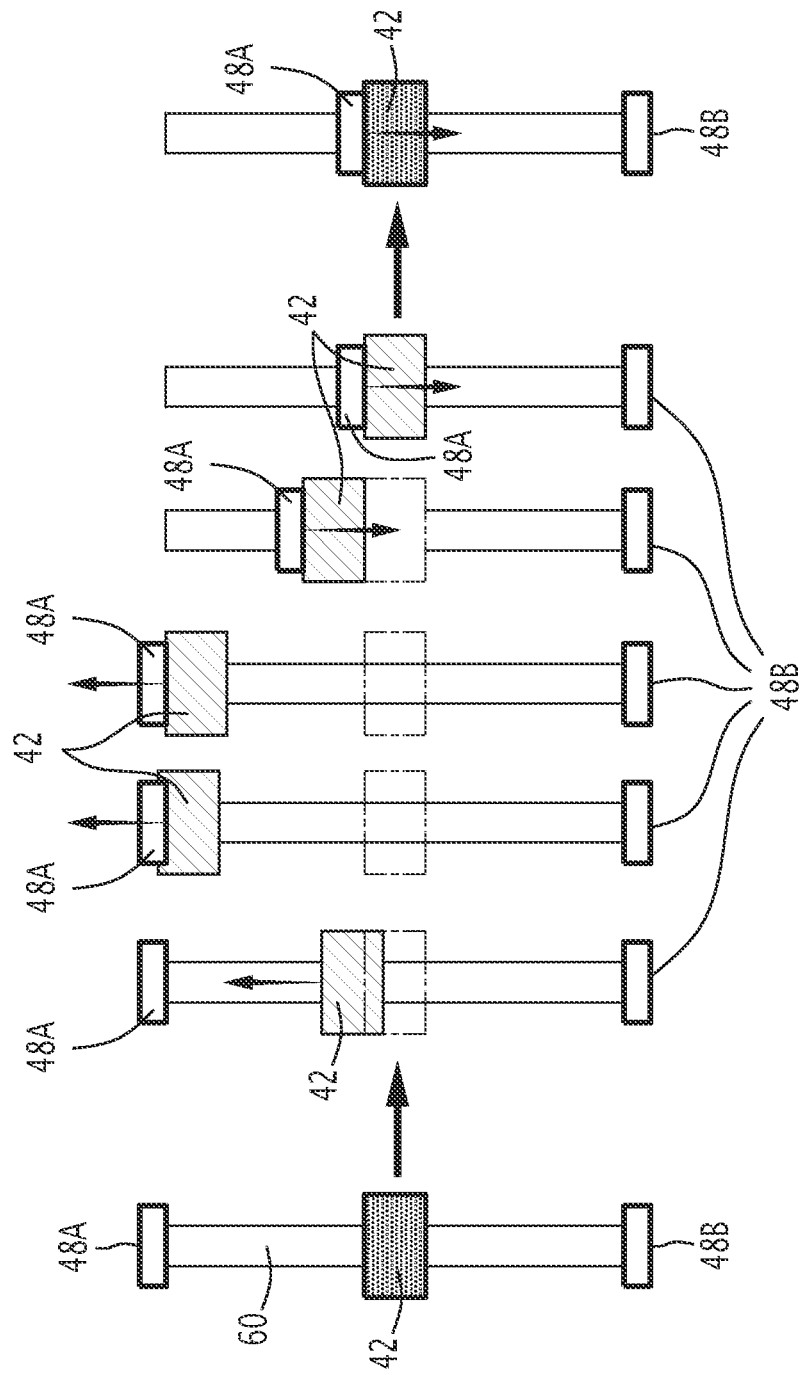
FIG. 6 is a view similar to FIG. 4, when implementing a maximum acceleration command, to the point of reaching the aircraft's maximum taxiing speed, relative to the fixed neutral position.

In the example shown in FIG. 6, if the pilot moves and holds the movable lever 42 to the maximum acceleration stop 48A, the maximum acceleration stop 48A remains fixed as long as the acceleration command thus defined remains possible, taking into account the current aircraft speed and the predefined maximum speed of the aircraft 10.

However, as the speed of the aircraft 10 approaches the predefined maximum speed, the active force application system 16 determines that the maximum possible acceleration command decreases and accordingly consequently moves the maximum acceleration stop 48A to the neutral position, pushing the movable lever 42 to the neutral position.

When the preset maximum speed is reached, the maximum acceleration stop 48A prevents the movable lever 42 from moving beyond the forward neutral position.

Figure 7:
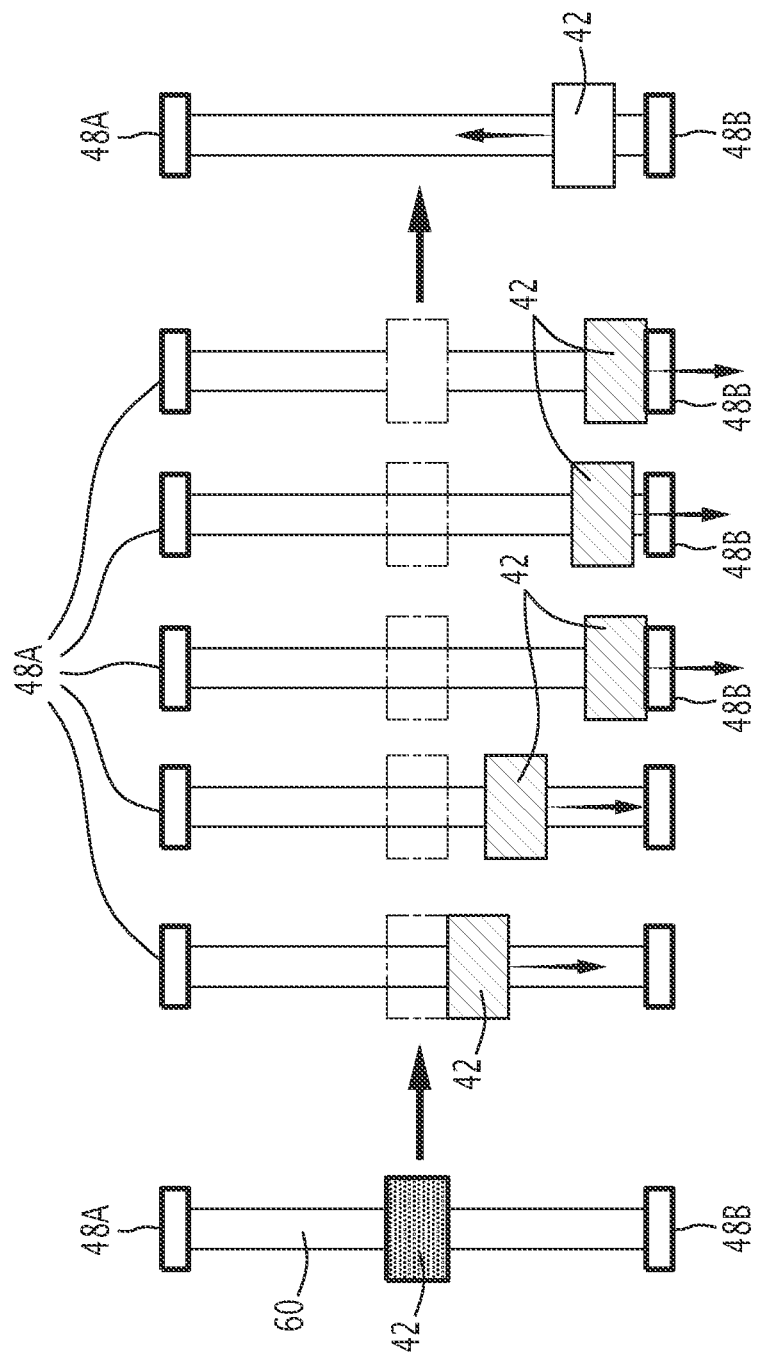
FIG. 7 is a view similar to FIG. 4, when implementing a maximum deceleration command of the aircraft, relative to the fixed neutral position.

Similarly, as illustrated in FIG. 7, when the pilot wishes to decelerate sharply, he moves the movable lever 42 to the maximum deceleration stop 48B, and holds it in that position, possibly until the aircraft 10 comes to a stop.

Figure 8:
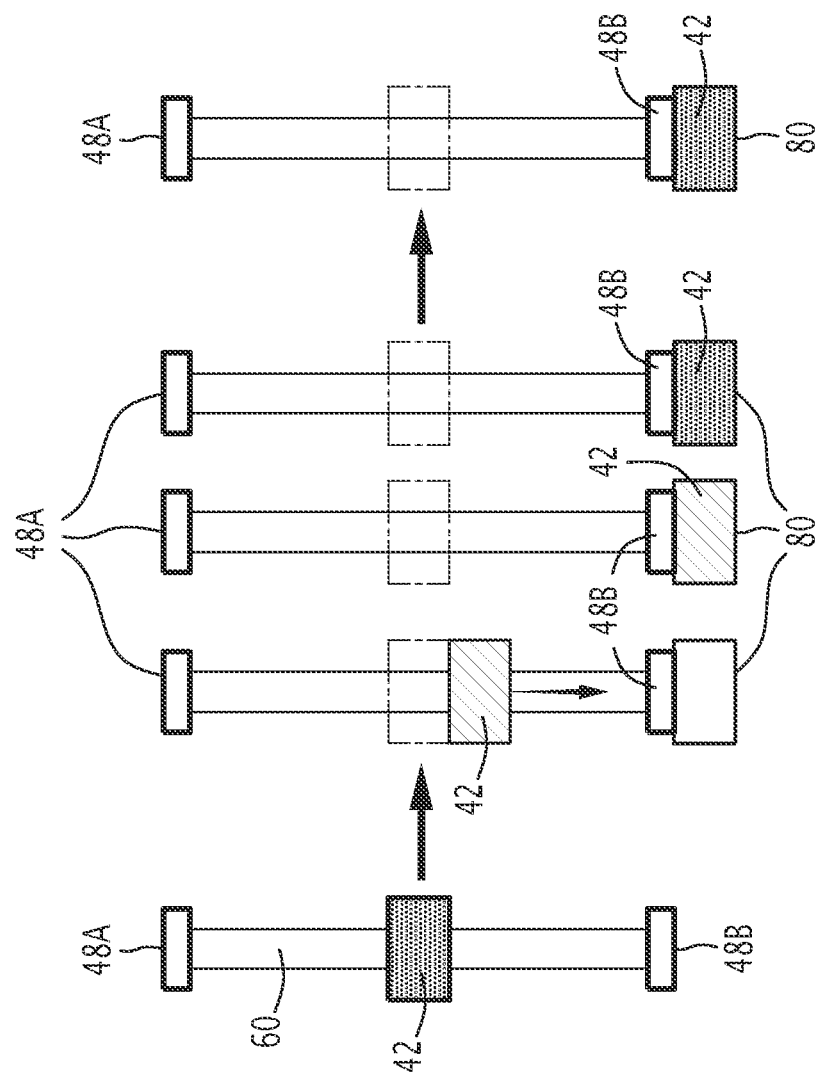
FIG. 8 is a similar view to FIG. 7, when implementing a maximum aircraft deceleration command, using a control member detent.

In the embodiment shown in FIG. 8, the force activation system 46 is adapted to define a maximum deceleration stop 48B that is passable by the pilot, and a detent 80 located beyond the maximum deceleration stop 48B. When the pilot passes the maximum deceleration stop 48B, and places the lever 42 in the detent 80, the lever 42 remains held in the detent 80, even if the pilot releases the lever 42, until the aircraft comes to a stop.

In the example shown in FIGS. 5 to 8, the neutral position is a fixed neutral position. It corresponds to a fixed point on the slide 60, for example in the middle of the slide 60.

In an embodiment illustrated in FIGS. 9 to 13, the neutral position is a movable neutral position which moves along the slide 60 in accordance with the current speed of the aircraft and the maximum possible rolling speed predefined for the aircraft 10.

The movable neutral position between the maximum acceleration stop 48A and the maximum deceleration stop 48B gives an indication of the current speed level in the permitted taxiing speed range [0; 50] knots, i.e. between 0 km/h and 93 km/h. The active force application system 46 locks the movable lever 42 to the movable neutral position, even in the absence of pilot action on the movable lever 42.

Figure 9:
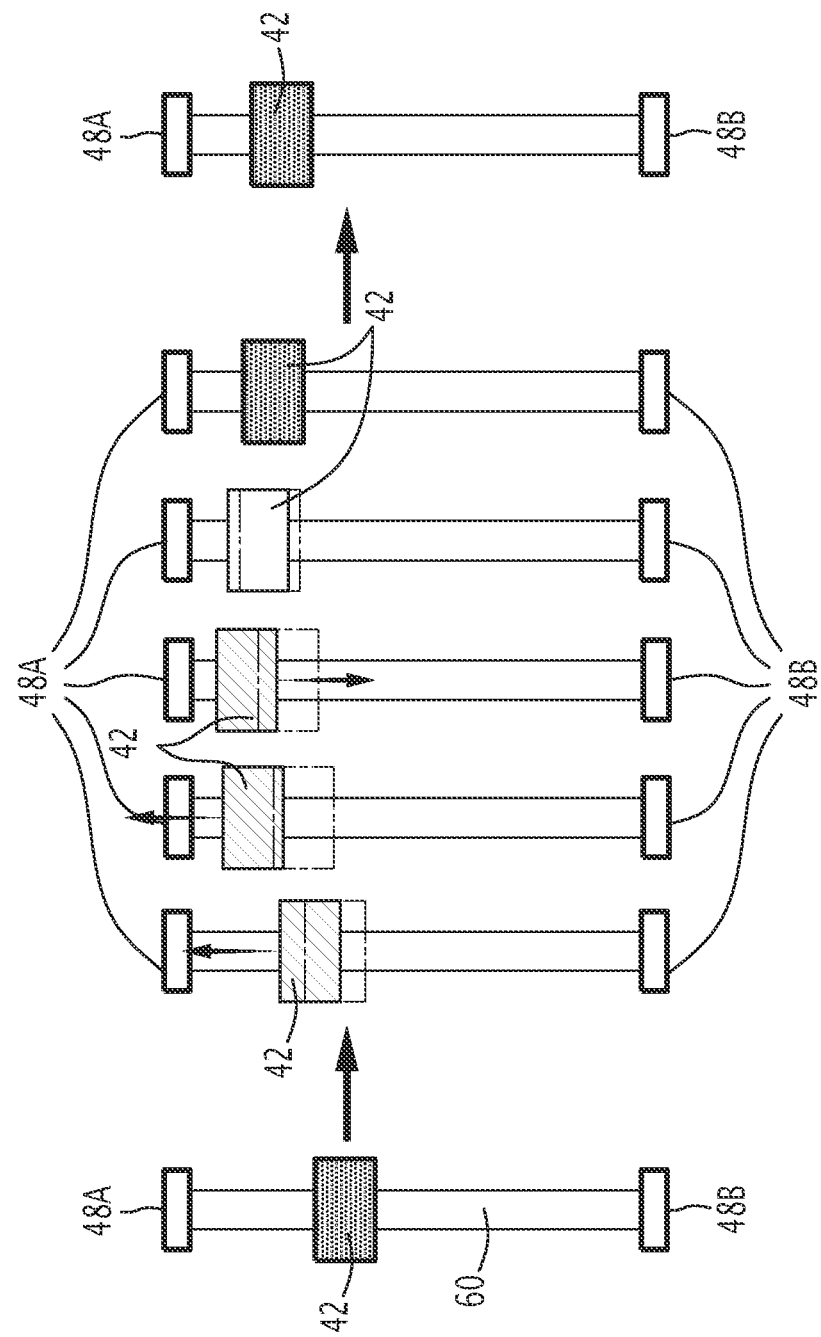

In the example shown in FIG. 9, when the pilot moves the lever 42 to apply an acceleration command, the movement of the movable lever 42 is limited at the bottom by the position of the movable neutral and at the top by the maximum acceleration stop 48A, which remains fixed.

The acceleration command set by the pilot with respect to the movable neutral position causes the central controller 32 to accelerate the aircraft 10 by maintaining the desired acceleration command, thereby increasing the speed of the aircraft 10. The movable neutral position thus gradually approaches the maximum acceleration stop 48A, as the current speed of the aircraft increases.

When the rider pilot releases the movable lever 42, it is biased to the new movable neutral position, which is different from the initial movable neutral position, before the acceleration command has been applied.

The movable neutral position to which the movable lever 42 is returned therefore gives the pilot an immediate visual indication of the current speed value in relation to the permitted speed range.

Figure 10:
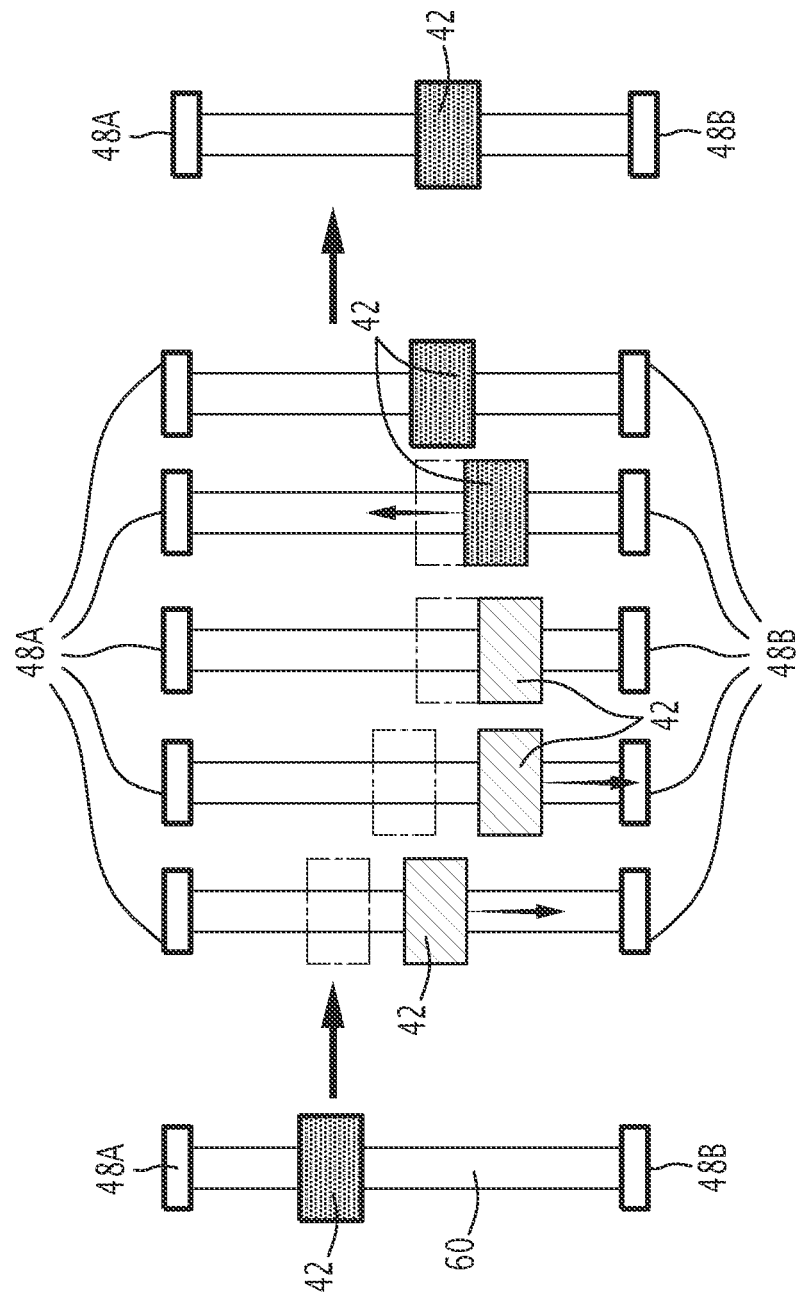

The same applies during deceleration of the aircraft, as shown in FIG. 10, where the movable neutral position moves towards the minimum deceleration stop.

Figure 11:
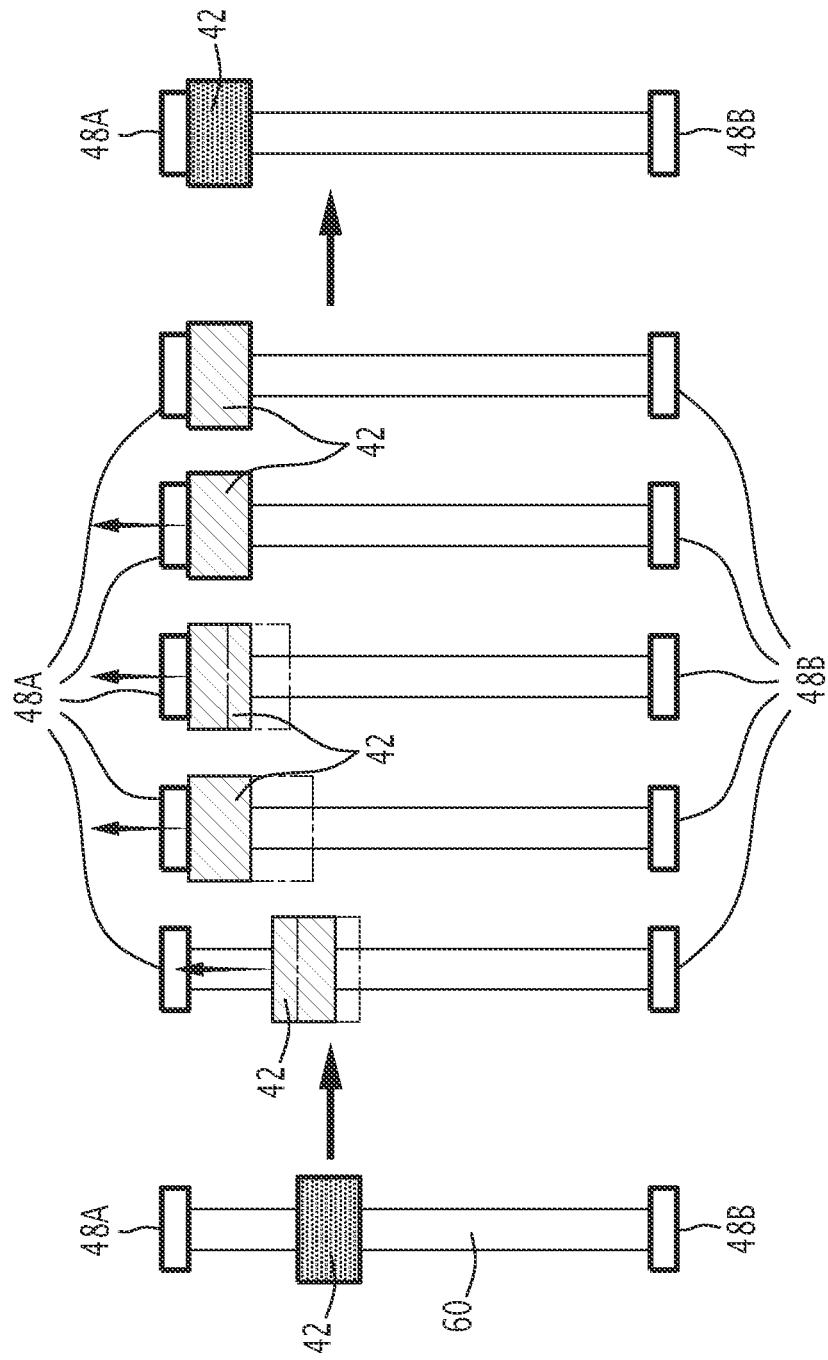

In the example shown in FIG. 11, when a maximum acceleration command is applied by placing the movable lever 42 in abutment with the maximum acceleration stop 48A, the movable neutral position moves progressively towards the maximum acceleration stop 48A, until it reaches the current position of the movable lever 42 when no further acceleration can be applied.

Figure 12:
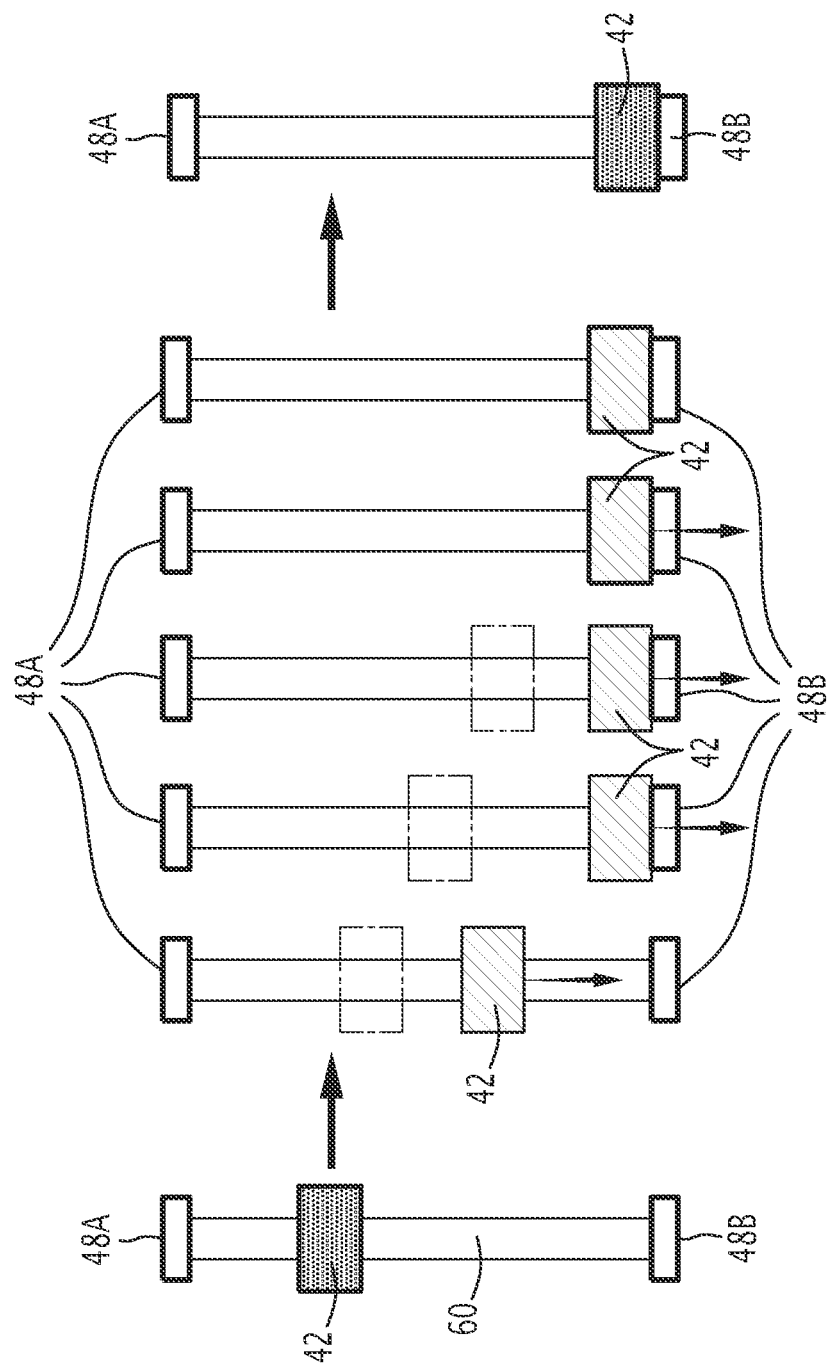

Similarly, in the example shown in FIG. 12, when a maximum deceleration command is applied by placing the movable lever 42 in abutment with the maximum deceleration stop 48B, the movable neutral position moves progressively towards the maximum deceleration stop 48B, until it reaches the current position of the movable lever 42 when no further deceleration can be applied.

Furthermore, with reference to FIG. 13, when a detent 80 is defined beyond the maximum deceleration stop 48B, the movable neutral position moves to the maximum deceleration stop 48B, with the movable lever 42 remaining in the detent 80.

In all of the above examples, the central controller 32 of the aircraft taxiing piloting assist device 12 in the active configuration pilots each engine 14 in its nominal thrust mode, advantageously without using the reverse thrust mode. Alternatively, the reverse thrust mode could be used.

Thanks to the aircraft taxiing piloting assist device 12 according to the present disclosure, the accelerations and decelerations commanded by the pilot are controlled, which has a very positive impact on the comfort of the passengers, by avoiding the jolts of acceleration or deceleration that occur when the pilot has difficulty in reaching the speed he wishes to apply.

In addition, the pilot's workload is reduced, since a single control member 30, comprising a mobile lever 42 is used to pilot both the propulsion engines 14 and the braking unit 16. Control is achieved by establishing an implicit command to accelerate or decelerate, the current speed being maintained once the pilot is satisfied with the speed achieved and releases the lever.

In addition, the aircraft taxiing piloting assist device 12 is adapted to maintain the aircraft 10 within a defined speed range by the presence of the maximum acceleration stop 48A, which is movable in case of a fixed neutral position, or is fixed when the neutral position is movable.

In the examples just described, the aircraft 10 has no electric motor to drive a wheel of the aircraft, independent of the propulsion engines 14 generating thrust for the aircraft. This makes the aircraft lighter, simplifies maintenance and reduces the risk of breakdowns.

In addition, there is no need for an additional device in the cockpit to control the speed setpoint.

In another embodiment, the aircraft 10 is equipped with at least one electric motor suitable for driving a wheel of the aircraft, independently of the propulsion engines 14 generating thrust for the aircraft.

The aircraft taxiing piloting assist device 12 is then able to pilot the electric motor and/or each braking device 16 to apply the acceleration or deceleration command defined by the control device command 30, rather than a speed setpoint, thereby improving passenger comfort.

In one embodiment, the control member 30 of the aircraft taxiing piloting assist device 12 is an additional control member beyond the member that commands the aircraft's mechanical energy variation used during take-off, flight and landing.

In another embodiment, the control member 30 has no movable lever. It includes, for example, hardware or software acceleration and deceleration buttons to control a movement of a cursor from a neutral position.

A display shows a gauge with the cursor, the neutral position, and the maximum acceleration and minimum deceleration stops.

What is claimed is:

1. An aircraft taxiing piloting assist device comprising:
   a control member operable by a pilot from a neutral position to define a taxiing piloting command to control a speed of an aircraft;
   a central controller configured to pilot at least one aircraft engine to apply the taxiing piloting command defined by the pilot, the taxiing piloting command being an acceleration or deceleration command of the aircraft during taxiing,
   wherein the control member is configured to be moved to a maximum acceleration stop and/or to a minimum deceleration stop.

2. The device according to claim 1, wherein the central controller is configured to additionally pilot at least one aircraft braking member in order to apply the acceleration or deceleration command defined by the pilot.

3. The device according to claim 1, wherein, after application of the acceleration or deceleration command and release of the control member, the control member is automatically returned to the neutral position.

4. The device according to claim 3, wherein the neutral position is a fixed neutral with respect to a stroke of the control member, the control member being automatically returned to the fixed neutral position.

5. The device according to claim 3, wherein the neutral position is a movable neutral position relative to a stroke of the control member, the control member being automatically returned to the movable neutral position, or the movable neutral being movable to a current position of the control member.

6. The device according to claim 1, wherein the maximum acceleration stop is configured to move along a stroke of the control member to limit the stroke of the control member as a function of a current aircraft speed.

7. The device according to claim 1, wherein the minimum deceleration stop is configured to be overcome to reach a maximum deceleration detent in which the control member is locked in position.

8. The device according to claim 1, wherein the at least one aircraft engine is a propulsion engine of the aircraft exerting a thrust force on the aircraft, and/or wherein the at least one aircraft engine is an electric motor to drive a wheel of the aircraft.

9. The device according to claim 8, wherein the at least one aircraft engine is a jet engine or a turboprop engine.

10. The device according to claim 8, wherein the control member comprises a movable lever configured to pilot the at least one aircraft engine to exert a thrust force and/or to pilot at least one aircraft drag modifier to reduce a mechanical energy of the aircraft, the device being configured to switch between an inactive configuration during take-off, flight and landing phases and an active configuration during taxiing.

11. The device according to claim 10, wherein the movable lever is configured to pilot the at least one aircraft engine to exert a thrust force and to pilot the at least one aircraft drag modifier to reduce a mechanical energy of the aircraft,
   wherein, in the inactive configuration, the control member is configured to be moved by the pilot to send to the central controller a command for varying the mechanical energy of the aircraft, so that the central controller pilots the at least one aircraft engine and the at least one aircraft drag modifier, without controlling a braking member of the aircraft,
   and wherein, in the active configuration, the control member is configured to be moved by the pilot to set an acceleration or deceleration command for the aircraft during rolling, intended for the central controller, so that the central controller pilots the at least one aircraft engine.

12. The device according to claim 10, comprising an activation button to switch the device in the active configuration, and/or a deactivation button to switch the device in the inactive configuration.

13. The device according to claim 12 wherein the activation button or/and the deactivation button is arranged on the movable lever.

14. The device according to claim 10, comprising a light-up display configured to produce at least one device activation, operation and/or deactivation luminous indicator.

15. An aircraft comprising:
   the device according to claim 1; and
   at least one aircraft engine for being piloted by the central controller in order to apply the acceleration or deceleration command defined by the control member.

16. The aircraft according to claim 15, comprising at least one braking member also configured to be piloted by the central controller to apply the acceleration or deceleration command defined by the control member.

17. A method for taxiing an aircraft, implemented with an aircraft taxiing piloting assist device, the method comprising:
   determining actuation, by a pilot, of a control member of the device, from a neutral position in order to define a taxiing piloting command;
   applying the taxiing piloting command defined by the pilot with a central controller of the device piloting at least one engine of the aircraft, the taxiing piloting command being an acceleration or deceleration command of the aircraft.

18. The method according to claim 17, wherein the central controller further pilots at least one braking member of the aircraft to apply the acceleration or deceleration command defined by the pilot.

19. An aircraft taxiing piloting assist device comprising:
   a control member operable by a pilot from a neutral position to define a taxiing piloting command to control a speed of an aircraft;
   a central controller configured to pilot at least one aircraft engine to apply the taxiing piloting command defined by the pilot, the taxiing piloting command being an acceleration or deceleration command of the aircraft during taxiing,
   wherein the central controller is configured to additionally pilot at least one aircraft braking member in order to apply the acceleration or deceleration command defined by the pilot,
   wherein the neutral position is a movable neutral position relative to a stroke of the control member, the control member being automatically returned to the movable neutral position, or the movable neutral being movable to a current position of the control member.

20. An aircraft taxiing piloting assist device comprising:
   a control member operable by a pilot from a neutral position to define a taxiing piloting command to control a speed of an aircraft;
   a central controller configured to pilot at least one aircraft engine to apply the taxiing piloting command defined by the pilot, the taxiing piloting command being an acceleration or deceleration command of the aircraft during taxiing, wherein the control member is configured to be moved to a maximum acceleration stop and/or to a minimum deceleration stop, wherein the maximum acceleration stop is configured to move along a stroke of the control member to limit the stroke of the control member as a function of a current aircraft speed.

21. An aircraft taxiing piloting assist device comprising:

a control member operable by a pilot from a neutral position to define a taxiing piloting command to control a speed of an aircraft;

a central controller configured to pilot at least one aircraft engine to apply the taxiing piloting command defined by the pilot, the taxiing piloting command being an acceleration or deceleration command of the aircraft during taxiing, wherein the at least one aircraft engine is a propulsion engine of the aircraft exerting a thrust force on the aircraft, and/or wherein the at least one aircraft engine is an electric motor to drive a wheel of the aircraft, wherein the control member comprises a movable lever configured to pilot the at least one aircraft engine to exert a thrust force and to pilot at least one aircraft drag modifier to reduce a mechanical energy of the aircraft, the device being configured to switch between an inactive configuration during take-off, flight and landing phases and an active configuration during taxiing, wherein, in the inactive configuration, the control member is configured to be moved by the pilot to send to the central controller a command for varying the mechanical energy of the aircraft, so that the central controller pilots the at least one aircraft engine and the at least one aircraft drag modifier, without controlling a braking member of the aircraft, and wherein, in the active configuration, the control member is configured to be moved by the pilot to set an acceleration or deceleration command for the aircraft during rolling, intended for the central controller, so that the central controller pilots the at least one aircraft engine.

* * * * *